(12) United States Patent
Jiao et al.

(10) Patent No.: US 11,938,460 B2
(45) Date of Patent: Mar. 26, 2024

(54) COMPOSITES FOR ATMOSPHERIC CONDENSABLE GAS RECOVERY

(71) Applicant: UNIVERSITY OF PITTSBURGH—OF THE COMMONWEALTH SYSTEM OF HIGHER EDUCATION, Pittsburgh, PA (US)

(72) Inventors: Shichao Jiao, Pittsburgh, PA (US); Joseph John McCarthy, Glenshaw, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 583 days.

(21) Appl. No.: 17/271,463

(22) PCT Filed: Oct. 28, 2019

(86) PCT No.: PCT/US2019/058274
§ 371 (c)(1),
(2) Date: Feb. 25, 2021

(87) PCT Pub. No.: WO2020/087061
PCT Pub. Date: Apr. 30, 2020

(65) Prior Publication Data
US 2021/0322950 A1    Oct. 21, 2021

Related U.S. Application Data

(60) Provisional application No. 62/750,909, filed on Oct. 26, 2018.

(51) Int. Cl.
*B01J 20/10*    (2006.01)
*B01J 20/26*    (2006.01)
(Continued)

(52) U.S. Cl.
CPC ............. *B01J 20/10* (2013.01); *B01J 20/261* (2013.01); *B01J 20/28* (2013.01); *C08F 120/14* (2013.01); *C08F 120/28* (2013.01); *C08K 3/36* (2013.01)

(58) Field of Classification Search
CPC ........ B01J 20/10; B01J 20/103; B01J 20/261; B01J 20/267; B01J 20/28; B01J 20/28026;
(Continued)

(56) References Cited

U.S. PATENT DOCUMENTS 4,683,258 A    7/1987 Itoh et al.
2003/0153457 A1    8/2003 Nemoto et al.
(Continued)

FOREIGN PATENT DOCUMENTS

WO    2018118360 A1    6/2018

OTHER PUBLICATIONS

Huerta-Angeles et al., "Super-porous nanocomposite PNIPAm hydrogels reinforced with titania nanoparticles, displaying a very fast temperature response as well as pH-sensitivity," European Polymer Journal, Pergamon Press Ltd Oxford (Aug. 19, 2014), 59:341-352.
(Continued)

*Primary Examiner* — Brian A McCaig
(74) *Attorney, Agent, or Firm* — Carol A. Marmo; Eckert Seamans Cherin & Mellott, LLC (57) ABSTRACT

The invention relates to novel composites for capture, e.g., absorption, of condensable gases and vapors from atmospheric sources, and gas or vapor streams, and the recovery of the condensed gases and vapors from the composites, as well as passive methods absent of external sources of energy for conducting the capturing and recovery processes. The composites include a hydrophilic matrix; hydrophilic solids embedded or immersed in the matrix, in close proximity to
(Continued)

each other; and porogenic material embedded in the matrix, having a size larger than the hydrophilic solids; wherein selective removal of the porogenic material from the matrix forms a hierarchically porous matrix.

15 Claims, 7 Drawing Sheets (51) Int. Cl.
*B01J 20/28* (2006.01)
*C08F 120/14* (2006.01)
*C08F 120/28* (2006.01)
*C08K 3/36* (2006.01)

(58) Field of Classification Search
CPC ............ B01J 20/28045; B01J 20/28047; B01J 20/3064; B01D 53/02; B01D 53/261; B01D 53/263; B01D 2253/106; B01D 2253/202; B01D 2253/25; C08F 120/14; C08F 120/28; C08K 3/36
See application file for complete search history.

(56) References Cited

U.S. PATENT DOCUMENTS

| | | |
|---|---|---|
| 2010/0005968 A1 | 1/2010 | Endo et al. |
| 2013/0015052 A1* | 1/2013 | Vane ................ C07C 29/80 203/16 |
| 2017/0276380 A1 | 9/2017 | Sakikawa et al. |

OTHER PUBLICATIONS

Ly et al., "Versatile functionalization platform of biporous poly (2-hydroxyethyl methacrylate)-based materials: Application in heterogeneous supported catalysis," Reactive and Functional Polymers (Oct. 31, 2017), 121:91-100.

Le Droumaguet et al., "Novel Polymeric Materials with Double Porosity: Synthesis and Characterization," Macromolecular Symposia (Jun. 1, 2014), 340:18-27.

International Search Report and Written Opinion Issued in International Patent Application No. PCT/US2019/058274, dated Jan. 9, 2020.

* cited by examiner

COMPOSITES FOR ATMOSPHERIC CONDENSABLE GAS RECOVERY

CROSS-REFERENCE TO RELATED APPLICATION

This application is a U.S. National Stage Application under 35 U.S.C. § 371 of International Patent Application No. PCT/US2019/058274, filed on Oct. 28, 2019, entitled "NOVEL COMPOSITES FOR ATMOSPHERIC CONDENSABLE GAS RECOVERY", which claims priority under 35 U.S.C. § 119(e) to United States Provisional Patent Application Serial No. 62/750,909, filed Oct. 26, 2018, entitled "NOVEL COMPOSITES FOR ATMOSPHERIC CONDENSABLE GAS RECOVERY", which are herein incorporated by reference.

GOVERNMENT SUPPORT

This invention was made with government support under CMMI 1634917 awarded by the National Science Foundation. The government has certain rights in the invention.

FIELD OF THE INVENTION

The present invention relates to novel composites for capture, e.g., absorption, of condensable gases and vapors from atmospheric sources, and gas or vapor streams, and the recovery of the condensed gases and vapors from the composites, as well as passive methods, absent of external sources of energy, for conducting the capturing and recovery processes. More particularly, the novel composites are capable of passively absorbing water directly from ambient air under a variety of humidity conditions with subsequent recovery being accomplished through application of low pressure, e.g., squeezing.

BACKGROUND OF THE INVENTION

An abundant supply of fresh water is a leading challenge of the 21$^{st}$ century. Recently, significant attention has been focused on the ability to capture or scavenge water directly from the atmosphere. Although a few materials and methods have been reported in the art that can actually recover water from ambient air, the approaches used generally require large energy consumption per unit of water recovered or function only under strict environmental conditions such as, extremely high relative humidity, i.e., fog or mist. However, the shortage of water in poor, underdeveloped and outlying areas necessitates simple and inexpensive methods that have yet to be fully realized.

It is estimated that there are more than two billion people in the world that lack access to safe drinking water, and the water demand is projected to increase by nearly one-third by 2050. Further, due to rapidly increasing consumption, accelerated environmental degradation, and greater impacts from climate change, there is a need to develop new ways to address the challenge of increasing demand of freshwater. While desalination has attracted considerable attention in recent decades due to its relatively low cost, its location is strictly limited by the access to the resource and therefore, requires a distribution infrastructure that has a significant upfront capital cost.

Meanwhile, there are over three quadrillion gallons of untapped fresh water in the atmosphere. Thus, a simple, cost-effective, efficient method of capturing water vapor as a main source of fresh water is desirable. In particular, there is a desire for a flexible system that is effective in the desert region which requires the ability of absorbing water under low relative humidity, while being efficient in poor and underdeveloped areas where the key issues include energy and cost.

Known methods for recovering water out of the atmosphere generally include the use of atmospheric water generators, which require very large energy input and various absorbents such as hydrogels, salts, MOFs and other materials that all utilize the natural variations of temperature or relative humidity between daytime and nighttime. In contrast, it is desirable to develop a simple way of scavenging atmospheric water using a capillary condensation effect. The water that is condensed will be transferred and stored in a highly hydrophilic material, i.e., a hydrogel, from which a certain amount of water will be able to be obtained, e.g., squeezed out, as a direct fresh water source.

Thus, there is a need in the art to design and develop systems and methods for the capture of condensable gases, e.g., water vapor, from atmospheric sources and gas and vapor streams, and recovery of the condensed gases, e.g., condensed water, wherein the systems and methods are safe, inexpensive, environmentally friendly, portable, easy to produce, simple to operate and effective to produce, for example, a supply of water from an atmospheric source.

SUMMARY OF THE INVENTION

An object of the present invention is to develop novel composites for the capture of condensable gases and vapors from atmospheric sources and gas and vapor streams, and recovery or extraction of the condensed gases and vapors, e.g., liquids. Another object is to develop passive methods absent of external energy for use in a variety of environmental conditions for the capture and recovery of condensable gases and vapors from the atmospheric sources and gas and vapor streams.

In particular, an object of the present invention is to provide a novel composite for absorption of water from ambient air under a variety of humidity conditions. Moreover, it is an object that the absorption of the water be conducted by a passive method that does not require an external energy source.

In particular, another object of the present invention is to provide a novel composite for absorption of condensable gas from a gas stream, as well as absorbing the gas by a passive method that does not require an external energy source.

In one aspect, the invention provides a composite having a matrix component and a solid component. For example, the invention provides a composite for absorbing condensable gas or vapor from an atmosphere or a gas or a vapor stream including a hydrophilic matrix, e.g., hydrogel, and a hydrophilic solid material in the hydrophilic matrix to form one or more contact spots (e.g., surface asperity, such as, surface roughness); and a porogenic material, e.g., polymeric particles, embedded in the matrix having a size that is larger than the hydrophilic solid material; wherein selective removal of the porogenic material/polymeric particles from the hydrophilic matrix forms a hierarchically porous matrix with pore spaces, and wherein the condensable gas or vapor is captured, and condensed gas or vapor is stored within the hydrophilic matrix and/or the pore spaces in the hierarchically porous matrix.

In certain embodiments, the matrix is a hydrogel; and/or the hydrogel includes hydroxyethyl methacrylate; and/or the solid material includes silica; and/or the solid material includes small particles having diameters less than 10 microns; and/or the porogenic material is polymer particles; and/or the polymer particles include polymethyl methacrylate; and/or the one or more contact spots include an asperity on a surface of the hydrophilic matrix formed by the solid material.

In another aspect, the invention provides a method of capturing condensable gas or vapor from an ambient atmosphere source or gas or vapor stream. The method includes preparing a composite, including obtaining a hydrophilic matrix; embedding or immersing the a hydrophilic solid material in the hydrophilic matrix forming one or more contact spots (e.g., surface asperity, such, surface roughness), for condensation; and a porogenic material, e.g., polymeric particles, having a larger size than the hydrophilic solid material; selectively removing at least a portion of the porogenic material/polymeric particles to form a hierarchically porous matrix with pore spaces; absorbing the condensable gas or vapor in the vicinity of the one or more contact spots and condensing to form condensed gas or vapor; storing the condensed gas or vapor in both the hydrophilic matrix as well as in the pore spaces in the hierarchically porous matrix; and extracting the condensed gas or vapor from the composite.

In certain embodiments, the extracting step includes hand squeezing the composite; and/or the selectively removing step includes dissolving.

Further, in certain embodiments, the composites and methods of the invention include hydrophilic solid material selected from small solid inclusions, small particles, needles, posts and combinations thereof, that are embedded or immersed in the hydrophilic matrix in close proximity to each other to form the one or more contact spots or surface asperity.

DETAILED DESCRIPTION OF THE INVENTION

The invention relates to composites, systems and methods for capturing or scavenging condensable gases and vapors from an atmospheric source or gas and vapor streams, and storing and recovering the condensed gas or vapor. The capture of condensable gases and vapors, and storage and recovery of the condensed gases and vapors are achieved by the composites of the invention. The composites are inexpensive to produce, implement and operate, capable of being reused, and do not require special handling for disposal. Further, the invention includes passive methods that do not require external sources of energy nor expensive and complex equipment. In certain embodiments, the invention is a binary, hierarchically-ordered solid-gel or particle-gel composite including smaller solid material or smaller size particles, e.g., silica, and larger size particles, e.g., polymethyl methacrylate particles, whose interstices are filled with hydrogel, e.g., polyhydroxyethyl methyacrylate hydrogel, capable of absorbing water vapor directly from ambient atmosphere at a variety of humidity conditions, and storing and recovering the condensed water. Moreover, it has been found that the composites, systems and methods of the invention provide an increase or enhancement in the efficiency of absorption as compared to like materials known in the art.

As used herein and the claims, "gel" means a homogeneous solid-like material usually comprised of cross-linked polymer, and "hydrogel" means a gel that is comprised of highly hydrophilic polymer elements. The term "hierarchically porous" means a porous material whose pores span a large range of sizes. The term "continuously porous" means a material that contains a system of interconnected pores that span substantially the entire material. The term "capillary condensation" refers to a process by which vapor is adsorbed into a porous medium and pore spaces fill with condensed liquid from the vapor phase. In accordance with the capillary condensation process, vapor condensation occurs below the saturation vapor pressure of the pure liquid. The term "porogenic" means particles that have the property of forming pores within a continuous matrix, e.g., when they are removed.

Furthermore, the term "solid(s)" or "solid material" or "solid component" encompasses various solid forms, such as, particles, inclusions, needles, sharp curves, pointed peaks, and posts. In accordance with embodiments of the invention, the close proximity of the solid(s), solid material or solid component to each other provide small surface asperities (surface roughness) that form contact spots to facilitate condensation. For ease of description, the following disclosure is directed to particle(s) and particle-gel composites, however, the terms "particle(s)", "particle component", "particle-gel" and the like are not limiting and encompasses solid(s), solid material and solid component.

The invention is a composition of matter, e.g., composite, composed of integrated components that include a backbone or matrix component and a particle component. The backbone or matrix component is a hierarchically porous material, such as, a hierarchically porous hygroscopic material. Small, hydrophilic particles are embedded in the backbone or matrix component, which are in sufficiently close proximity to each other, such as to mechanically enhance condensation of gas or vapor. As a result of the close proximity of the particles, small surface asperities (surface roughness) are formed that provide nucleation sites. The one or more asperities are formed on a surface of the backbone or matrix component and created by the hydrophilic particles in close proximity to each other, embedded or immersed in the backbone or matrix. The asperities have a size on the order of tens of nanometers, e.g., from 10-90 nanometers, and in certain embodiments, about 30 nanometers. The small, hydrophilic particles vary in size and in certain embodiments, their diameter is less than 10 micron. Suitable small, hydrophilic particles for use in the invention include those composed of silica and/or other naturally-occurring or man-made particles with highly hydrophilic surfaces, e.g., fumed silica and/or sand particles. Furthermore, the backbone or matrix component is composed of a hydrogel. Suitable hydrogels for use in the invention include polyhydroxyethyl methacrylate (pHEMA), polyacrylic acid, polyacrylamide, and mixtures or combinations thereof. The hydrogels are prepared using conventional techniques for the polymerization of hydrophilic monomers, such as, acrylates including but not limited to hydroxyethyl methacrylate, acrylamide and acrylic acid derivatives. In certain embodiments, the monomer constitutes from about 25% to about 40% of the hydrogel components.

In addition to the small, hydrophilic particles, the backbone or matrix component also includes large porogenic particles, i.e., having a larger diameter than the small, hydrophilic particles. In certain embodiments, the size of the large porogenic particles is larger than 50 micrometers, to facilitate rapid gas diffusion. Suitable large porogenic particles for use in the invention include those composed of polymethyl methacrylate (PMMA) or other polymeric materials that can be selectively removed from the hydrogel matrix by chemical or thermal means. The chemical means includes dissolution in a solvent, such as dichloromethane. In certain embodiments, particle-gel composites are produced by infusing interstices of the small, hydrophilic particles, e.g., silica, and large porogenic particles, PMMA, with a hydrogel backbone or matrix, cross-linked pHEMA. The large PMMA particles are then selectively removed to create pores or pore spaces in the hydrogel backbone or matrix component, e.g., a continuously porous backbone or matrix component.

Capillary condensation is used in capturing condensable gases and vapors. Without intending to be bound by any particular theory, it is believed that the combination of mechanical and chemical activity (e.g., capillary condensation and subsequent absorption into the hierarchically porous backbone or matrix component) enables the resulting particle-gel composite to enhance capturing and recovering of condensable vapor from the atmosphere by at least a factor of two under most ambient humidity conditions when compared to a simple porous material. The combination of these two mechanisms enhances the recovery efficacy as compared to the recovery efficacy of each mechanism individually.

The particle-based structure is used to create locations, e.g., contact spots, for capillary condensation and the water from the contact spots is stored in a storage place such as the hydrogel component. In accordance with the invention, the condensed gas or vapor, e.g., liquid, from the contact spot is then directly stored, e.g., contained, in the pores or pore spaces or directly within the matrix component, e.g., hydrogel. By using a hydrogel that is squeezable, water recovery is realized by hand squeezing the hydrogel to release the stored condensed gas or vapor. Therefore, water extraction and recovery can be realized by simple finger pressure or hand squeezing applied to the particle-gel composites.

In certain embodiments, the particle-gel composites include small silica particles that provide numerous capillary condensation locations or contact spots due to their close proximity to each other. When exposed to the atmosphere, vapor, e.g., water vapor, condenses at the locations or contact spots. The composites also include the large polymeric particles, e.g., PMMA particles, and the backbone or matrix component, e.g., pHEMA hydrogel, that fills the space in between the small silica particles and partially serves as a reservoir to store condensed vapor/liquid, e.g., water, that is absorbed from the atmosphere. At least a portion of the large polymeric particles are selectively removed to form a porous backbone or matrix component, which serves both to enhance the availability of composite surface area as well as to serve as an additional reservoir to store condensed vapor/liquid, e.g., water, that is absorbed from the atmosphere. The composites are then hand-squeezed to release and recover the stored condensate.

Figure 1:
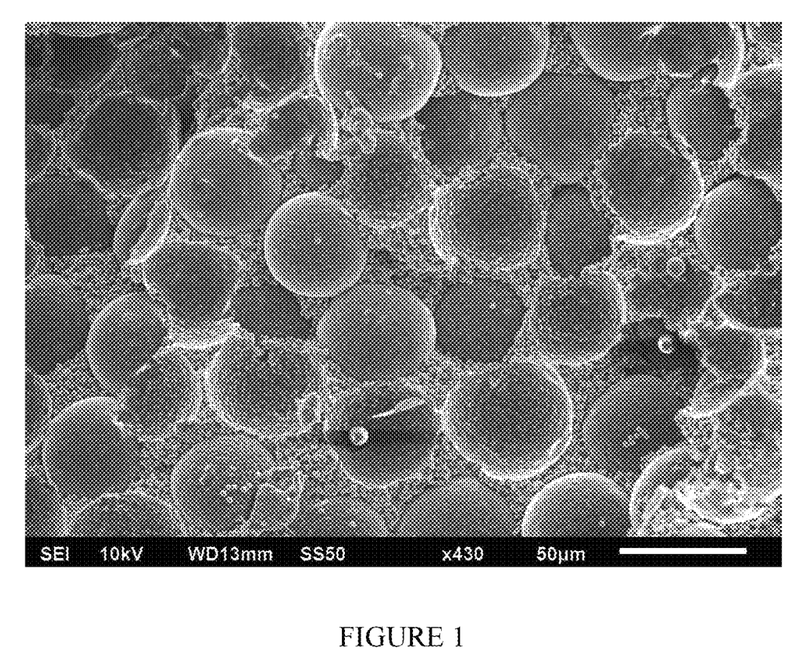
FIG. 1 is an image that shows a binary hierarchically-ordered particle-gel composite according to the invention, formed with smaller size silica particles and larger size polymethyl methacrylate (PMMA) particles whose interstices are filled with cross-linked polyhydroxyethyl methacrylate (pHEMA) hydrogel, in accordance with certain embodiments of the invention.

FIG. 1 is an image that shows a binary, hierarchically particle-gel composite according to the invention, formed with small size silica particles and larger size polymethyl methacrylate (PMMA) particles whose interstices are filled with cross-linked polyhydroxyethyl methacrylate (pHEMA) hydrogel.

Figure 2:
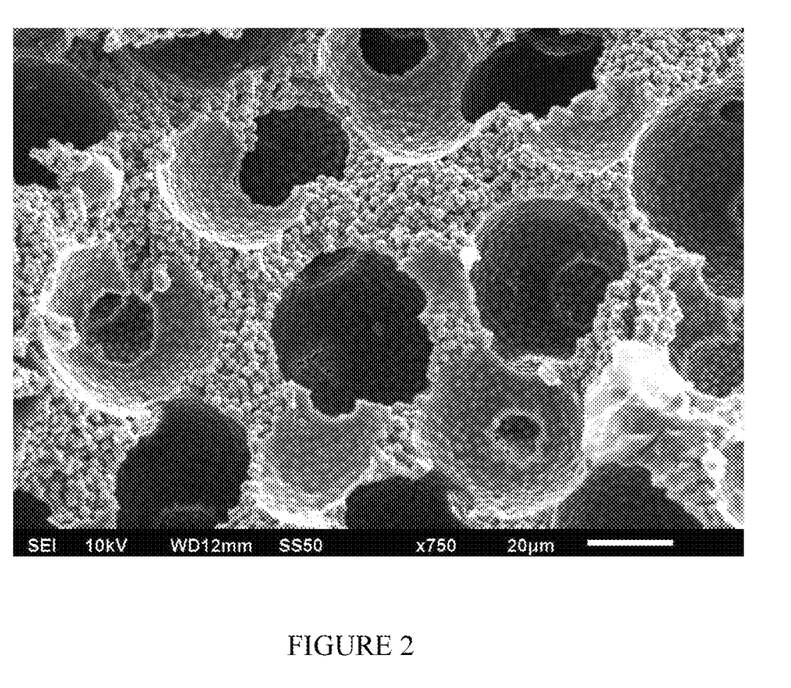
FIG. 2 is an image that shows the large sized particles (PMMA) as shown in FIG. 1 are selectively removed by dissolution to form a continuously porous structure, in accordance with certain embodiments of the invention.

The image in FIG. 2, shows the larger size particles (PMMA) are dissolved, e.g., selectively removed by a solvent, to form a continuously porous structure that provides significant heat and mass transport properties.

As aforementioned, the novel particle-gel composites of the invention provide a means to capture or scavenge, store, and recover and/or extract ambient water vapor and other condensable gases or vapors that is portable, economical, environmentally friendly, and simplistic. The absorption process is completely passive and does not require an external energy source, specific or complex equipment, or particular environmental conditions to function. The composites according to the invention have good performance under a variety of environmental conditions, which is needed for the diverse areas and climates that have shortages of water. Compared to known absorbents, the novel composites greatly increase the efficiency of absorption and therefore, the novel composites provide efficient extraction of drinkable quantities of water by mere hand squeezing.

It will be appreciated by those skilled in the art that changes could be made to the embodiments described above without departing from the broad inventive concept thereof. It is understood, therefore, that this invention is not limited to the particular embodiments disclosed and the following examples conducted, but it is intended to cover modifications that are within the spirit and scope of the invention.

EXAMPLES

Figure 3:
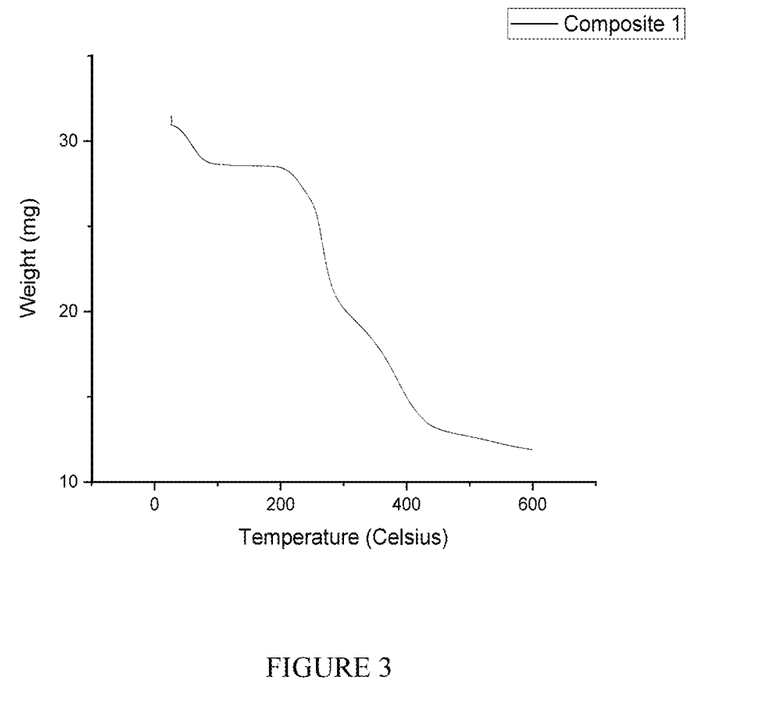
FIG. 3 is a Thermal Gravimetric Analyzer (TGA) plot for a composite prepared according to the invention.

Particle-gel composite samples were prepared according to the invention, which consisted of hydrogel, small silica particles, and large PMMA particles. The monomer concentration was either 40% or 25% by weight in the hydrogel preparation. A control composite was prepared that was composed of hydrogel, also with a monomer concentration of either 40% or 25%, and large PMMA particles. The control sample did not include the small silica particles. The composites were tested under different relative humidity conditions. The absolute dry weight for each sample was determined by Thermal Gravimetric Analyzer (TGA). Samples were kept under 120° C. in the TGA for one hour to allow full water removal. The temperature was increased to 600° C. to burn off all of the hydrogel to determine the material ratio in each sample. FIG. 3 is a TGA diagram for one of the composites prepared according to the invention. The weight of the sample was initially 31.5 mg and decreased to 28.6 mg under the 120° C. isotherm, and the final weight was 11.9 mg at 600° C. This data indicated that the composition of water, hydrogel and silica particles was 6.5 mg, 16.7 mg and 11.9 mg, respectively, under the relative humidity used in the particular test.

Figure 4:
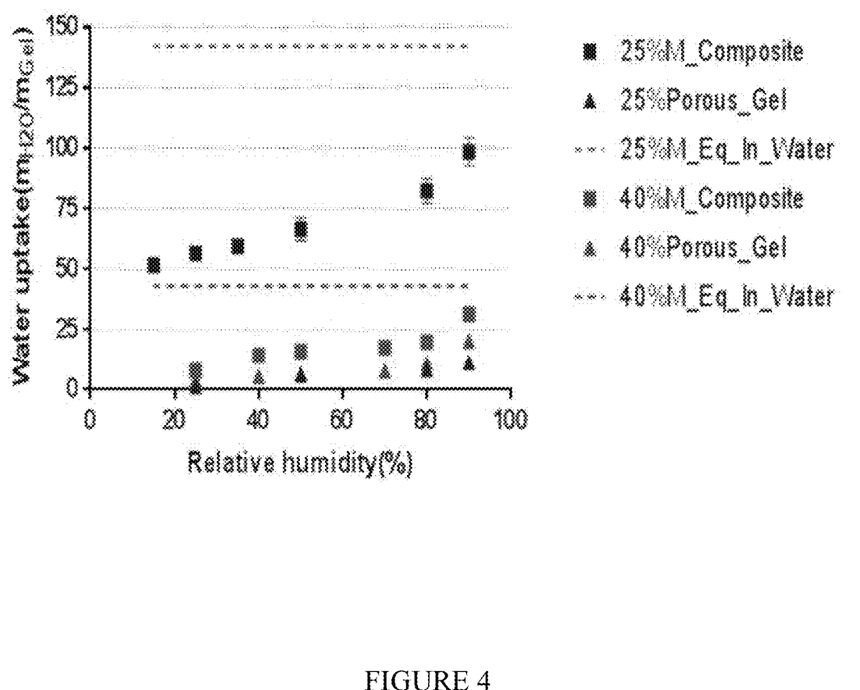
FIG. 4 is a plot that shows a performance comparison of composites made from hydrogels with 40% and 25% monomer, respectively, compared to performance of the corresponding pure porous gels conducted for a series of different relative humidity, in accordance with certain embodiments of the invention.

A performance comparison of composites with 40% and 25% monomer and the corresponding pure porous gel was conducted for a series of different relative humidity, and the results are shown in FIG. 4. The performance was quantified based on the mass of water absorbed by the composites as compared to the mass of the gel included within the composite. Note that, under typical atmospheric conditions (i.e., about 50% relative humidity), the composite recovered from an ambient gas source almost 50% of the water that would have been available from a liquid source. The porous hydrogel control, in contrast, performed at less than half of this efficacy.

Figure 5:
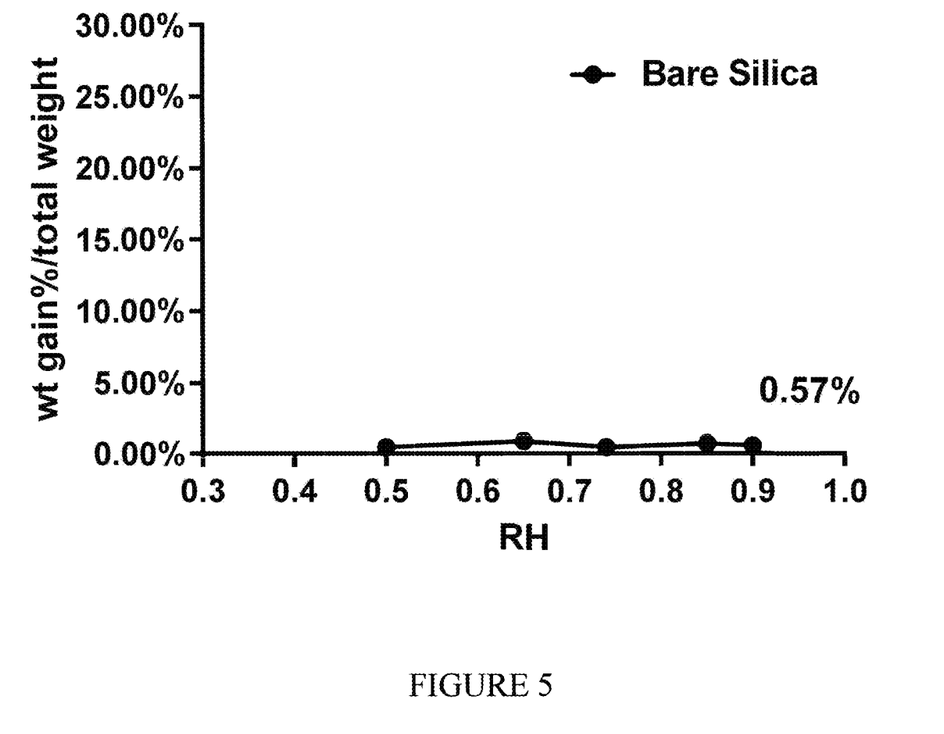
FIG. 5 is a plot that shows bare silica particles as a control sample and the dramatically lower level of efficacy than the composites prepared according to the invention.

Additionally, measurements were taken for a separate control sample wherein bare silica particles were tested under different relative humidity. In this control sample, the hydrogel reservoir was eliminated. The results, as illustrated in FIG. 5, show that the control sample performed at a dramatically lower level of efficacy than the composites prepared according to the invention.

Figure 6:
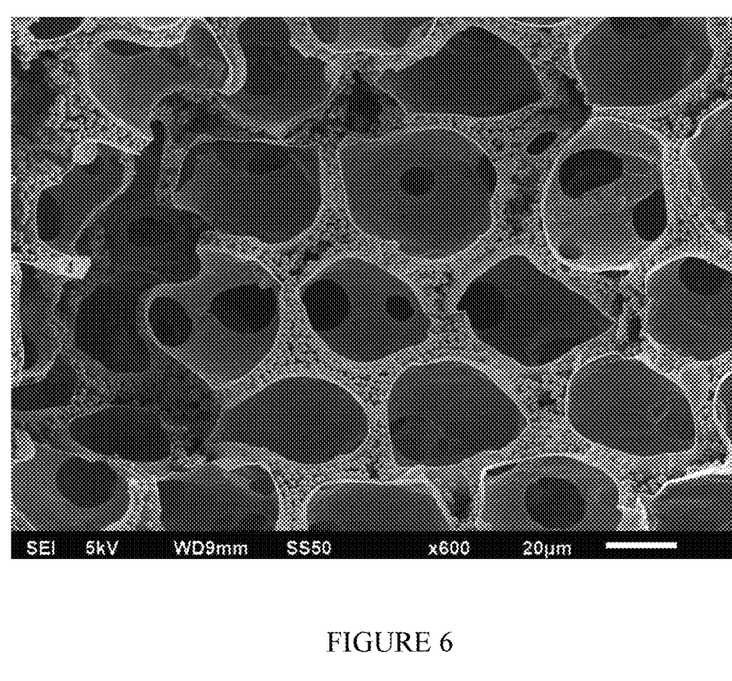
FIG. 6 is an image that shows the morphology of a composite with 25% monomer concentration, in accordance with certain embodiments of the invention.

In subsequent testing, it was found that 40% monomer concentration provided robust mechanical properties, however, the hand squeezing function was not optimal. Only one percent of the captured water was extracted or reclaimed, such that only 0.4% of the water captured or scavenged from a liquid source was recovered by hand squeezing. The monomer concentration was then lowered to 25%. At this lower monomer concentration, dramatically improved extraction and recovery performance was observed as compared to the performance for the 40% monomer concentration. The morphology of the composite with 25% monomer concentration is shown in FIG. 6.

Figure 7:
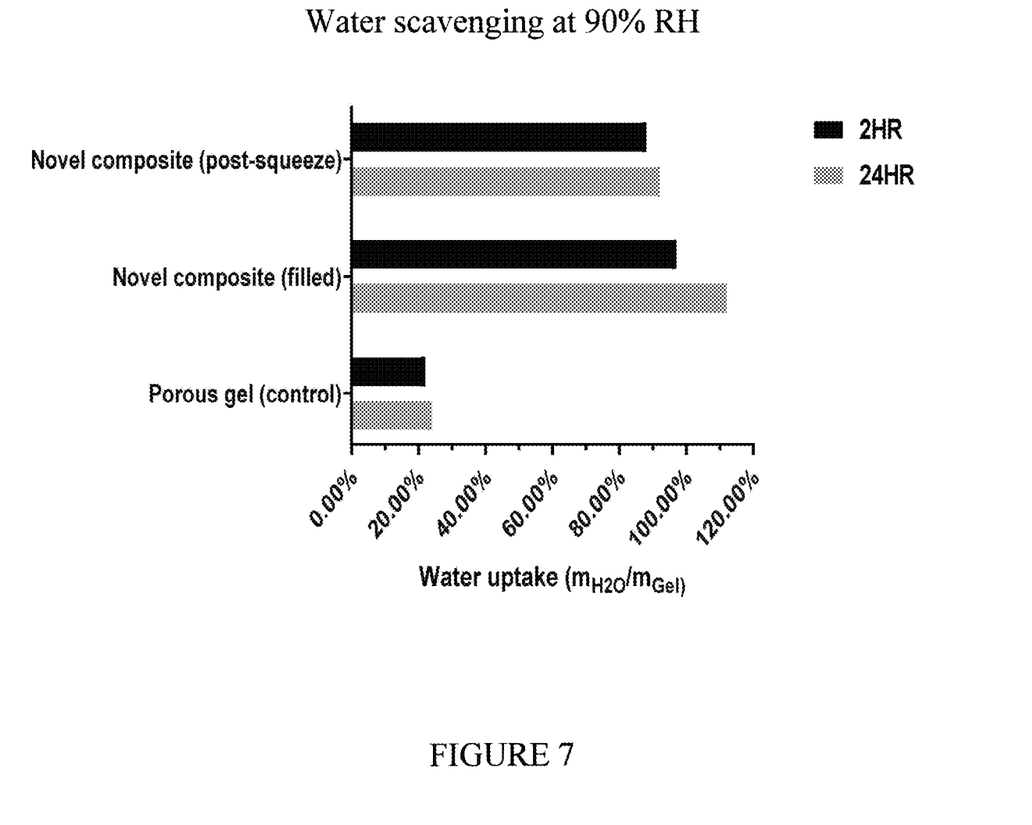
FIG. 7 is a graph that illustrates water scavenging performance comparison for a control sample and samples in accordance with certain embodiments of the invention.

In further testing, the composite sample having 25% monomer concentration was tested both over a short time (2 hours) and a long time (24 hours). Over the short time, the composite achieved 97% relative water absorption (mass of water per mass of gel within the composite), as compared with 22% for the porous gel control sample, at 90% relative humidity. Over the long time and the same relative humidity conditions, the composite achieved over 110% relative water absorption (compared to 24% for the control). Moreover, almost 9% of the mass of the gel was reclaimed as pure water via hand squeezing from the short time sample, while about 20% was reclaimed from the long time sample. The results equate to about a 12 gram sample of the composite according to the invention having the capacity of scavenging and releasing, e.g., via a simple finger squeeze, 1 mL of clean liquid water per squeeze (meaning that a sample that is roughly three quarters of a pound could recover an ounce of water per squeeze). FIG. 7 illustrates the performance comparison.

We claim:

1. A composite for absorbing condensable gas or vapor from an atmosphere or a gas or a vapor stream, comprising:
    a hydrophilic matrix;
    a hydrophilic solid material in the hydrophilic matrix to form one or more contact spots; and
    a porogenic material embedded in the matrix, having a size larger than the hydrophilic solid material,
    wherein selective removal of the porogenic material from the hydrophilic matrix forms a hierarchically porous matrix with pore spaces, and
    wherein the condensable gas or vapor is captured, and condensed gas or vapor is stored in the hydrophilic matrix and/or pore spaces in the hierarchically porous matrix.

2. The composite of claim 1, wherein the hydrophilic matrix is hygroscopic.

3. The composite of claim 1, wherein the hydrophilic matrix comprises a hydrogel.

4. The composite of claim 3, wherein the hydrogel comprises hydroxyethyl methacrylate.

5. The composite of claim 1, wherein the hydrophilic solid material is selected from the group consisting of solid inclusions, small particles, needles, posts and combinations thereof, that are in close proximity to each other.

6. The composite of claim 5, wherein the small, particles have diameters of less than 10 microns.

7. The composite of claim 1, wherein the solid material comprises silica.

8. The composite of claim 1, wherein the porogenic material comprises polymeric particles.

9. The composite of claim 8, wherein the polymeric particles comprise polymethyl methacrylate.

10. The composite of claim 1, wherein the one or more contact spots facilitates capillary condensation of the condensable gas or vapor.

11. The composite of claim 1, wherein the one or more contact spots comprises an asperity on a surface of the matrix formed by the solid material.

12. A method of capturing condensable gas or vapor from an ambient atmosphere source or a gas or a vapor stream, comprising:
    preparing a composite, comprising:
        obtaining a hydrophilic matrix;
        embedding or immersing a hydrophilic solid material in the hydrophilic matrix, forming one or more contact spots for condensation;
        embedding in the hydrophilic matrix a porogenic material having a larger size than the hydrophilic solid material; and
        selectively removing at least a portion of the porogenic material to form a hierarchically porous matrix with pore spaces;
    absorbing the condensable gas or vapor in the one or more contact spots and condensing to form condensed gas or vapor;
    storing the condensed gas or vapor in the hydrophilic matrix and/or the pore spaces in the hierarchically porous matrix; and
    extracting the condensed gas or vapor from the composite.

13. The method of claim 12, wherein the condensing step comprises capillary condensation occurring at the one or more contact spots comprising an asperity on a surface of the hydrophilic matrix created by the hydrophilic solid material.

14. The method of claim 12, wherein the extracting step comprises hand squeezing the composite.

15. The method of claim 12, wherein the selectively removing step comprises dissolving.

* * * * *